No. 767,845. PATENTED AUG. 16, 1904.
H. T. SPEARS.
SELF OILING JOURNAL BOX.
APPLICATION FILED AUG. 13, 1903.
NO MODEL.

Witnesses
Ralph A. Shepard
C. E. Brown

Hart T. Spears, Inventor
by Chester W. Brown
his Attorney

No. 767,845.

Patented August 16, 1904.

UNITED STATES PATENT OFFICE.

HART T. SPEARS, OF HENRIETTA, MICHIGAN.

SELF-OILING JOURNAL-BOX.

SPECIFICATION forming part of Letters Patent No. 767,845, dated August 16, 1904.

Application filed August 13, 1903. Serial No. 169,343. (No model.)

*To all whom it may concern:*

Be it known that I, HART T. SPEARS, a citizen of the United States, residing at the town of Henrietta, in the county of Jackson and State of Michigan, have invented a new and useful Improvement in Self-Oiling Journal-Boxes, of which the following is a specification.

My invention relates to journal-boxes which require constant lubrication by fluid lubricant; and the special advantages of my said improvement are to supply the fluid lubricant regularly and continuously to said journal-box in about the quantity consumed by said journal-box; second, to provide means for distributing it evenly over approximately the entire length of the bearing in said box, and, third, to provide means for collecting any portion of said fluid lubricant which may be in excess of the amount required to lubricate said journal-box and again apply the same to said journal-bearing, other advantages being apparent from the following description.

Figure 1:
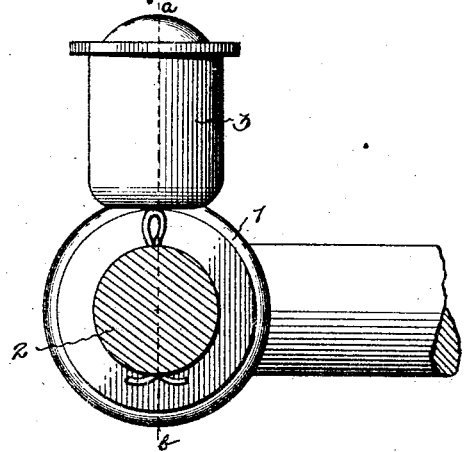
Figure 2:
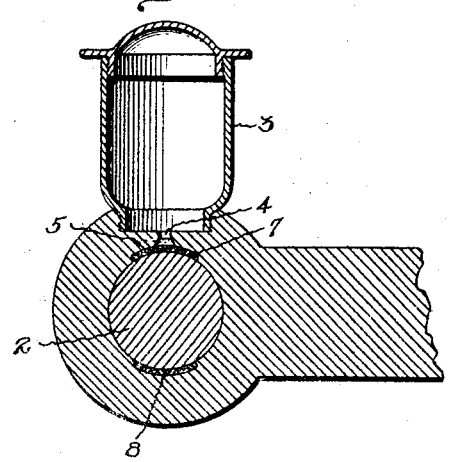
Figure 3:
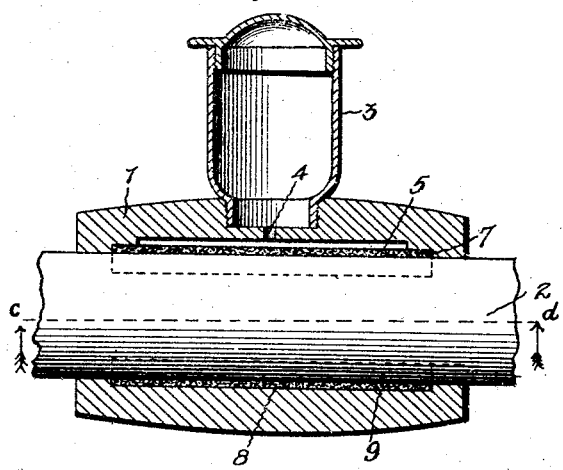
Figure 4:
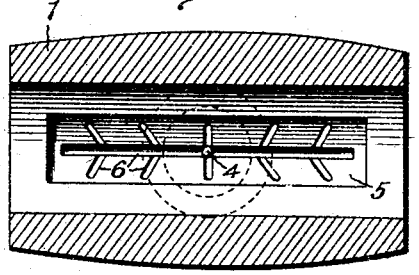

In the drawings hereto attached and which form a part hereof, and in which similar figures of reference refer to similar parts, Figure 1 is an elevation of a journal-box and shaft having my improved self-lubricating attachment thereon. Fig. 2 is a section view of the same. Fig. 3 is a longitudinal section view on the line *a b* of Fig. 1. Fig. 4 is a section view on the line *c d*, as indicated by arrows, the oil-absorbing material being removed.

In the drawings shown herewith I have shown my improved journal-box as applied to the pitman on a harvesting-machine; but it will be apparent that it may also be employed in any shape or form of journal-box with equal efficiency.

In the drawings shown herewith, 1 designates the journal-box, and 2 the shaft which is disposed therewithin.

The numeral 3 designates some suitable oil cup or reservoir for supplying a quantity of oil to the said journal and may be of any desired form. It will be apparent from the description following that it is of immaterial consequence as to what style or shape of oil-cup is employed, as the oil is all strained, and consequently should any sand or grit enter through said oil-cup it will be prevented from reaching the bearing by means of the construction hereinafter described.

The numeral 4 designates the opening leading from the oil-cup to the bearing. While I have shown my device in connection with an oil-cup and having this opening 4 leading from said cup to my said improved device, yet it is apparent that the oil-cup may be omitted and the oil supplied directly through the said opening 4 to the bearing from an oil-can, as is frequently done in machinery where only a limited amount of oil is required.

On the upper surface of the journal-box at 5 I have constructed a recess, as shown in Fig. 4. This recess is connected with the opening 4, and whatever oil is fed to said bearing from said opening 4 enters into the recess 5. From the opening 4 where it connects with said recess 5 I have constructed one or more grooves, as shown at 6 in Fig. 4. The object of these said grooves is to distribute the oil entering through the said hole 4 evenly to the different portions of the recess 5 and to the upper surface of the pad or porous substance 7, disposed within said recess, as shown. By this means the oil supplied through the opening 4 is distributed over the upper surface of the pad 7 and seeps through it, keeping it at all times saturated with oil, which is rubbed off from the under side continuously by the revolution of the shaft 2 as it turns within the said journal-box and by this means supplies the fluid lubrication evenly and in just the required amount to keep the said journal-box and shaft lubricated at all times and approximately over its entire length, thus preventing a waste of the oil and the heating and injury to the box by its becoming dry after the oil has been exhausted. It will also be seen that by reason of the flow of oil being retarded, as shown, by compelling all of the oil to pass through the pad 7 the rate at which said oil is furnished to said bearing is retarded and the supply in the oil-cup lasts a much longer time, requiring less frequent filling, at the same time being a saving in the expense and preventing damage to the journal and shaft by overcoming the liability of its running dry and cutting.

In addition to the pad 7, as above described,

I have also placed a pad, as 8, in a second recess, as 9, in the lower portion of the journal-box. This pad is composed of absorbent material, and in case there should be an excess of oil supplied to the shaft by the device above described the said pad 8 absorbs any surplus and retains it to be redistributed upon said shaft again in case the pad at the upper side of the journal-box 7 fails at every revolution to supply said shaft with sufficient oil to properly lubricate the said journal. By this construction it will be seen that any oil which might otherwise be wasted and run out at the end of the box is conserved and again used in case of necessity to automatically lubricate the said journal. It will also be seen that by straining all of said oil through the pad 7 any grit or sand that may accidentally be in said oil or may have accidentally entered said oil-hole 4 is prevented from reaching the said bearing and injuring the same.

In operation a suitable amount of oil is poured into the oil-cup or into the oil-hole, in case there be no oil-cup, at certain intervals, as once each day while in use, or oftener, if necessary. This oil passes down through the oil-hole 4 and is distributed over the upper surface of the pad 7 by means of the grooves 6. The said pad prevents the oil from flowing upon the journal more rapidly than it is required by retarding the rate of flow through its substance to the said shaft. By this means the said pad 7 becomes thoroughly saturated with oil, and upon each revolution of the said shaft it supplies to said shaft an amount of oil equal to that consumed during that revolution, at the same time straining the said oil to intercept and prevent grit or sand from reaching said bearing. By this means as long as there is a supply of oil in the oil-cup or oil-hole the said device continues to supply said journal with lubricant regularly and evenly. In case for any reason too much oil should pass through said pad to the shaft it would naturally be carried by the force of gravity to the lower portion of the journal-box, and there I have placed a second pad to absorb the said oil so escaping and retain it from escaping from said journal-box, and in case for any reason the oil-cup and upper pad should cease or fail to furnish the lubricant the shaft would take up oil from the accumulation in the pad 8, which would prevent its becoming dry and cutting until all of the oil in said pad 8 had been consumed thereon. By this construction it will be seen that I employ a double means of lubricating said shaft and conserving the oil and supplying it to said shaft in the most even and perfect manner and with the least loss or risk of damage to said bearing of becoming cut by sand or grit or becoming dry and cutting from lack of lubricant.

Having thus described my said invention, what I claim, and desire to secure by Letters Patent, is the following:

A journal-box comprising spaced recesses formed directly in the bore thereof and an opening in the box leading from the exterior thereof to one of the recesses, the recess having the opening leading thereinto provided with a centrally-arranged longitudinal groove formed in its top wall and having other grooves branched therefrom, and an oil-pad arranged within each recess, the grooves formed in the top wall of one of the recesses being covered by the pad of the said recess, both pads being arranged with relation one to the other so that one pad may take up the oil lost from the other pad, thereby preventing oil from working its way out of the ends of the box, the oil being initially supplied through the aforesaid opening and means for covering said opening.

In witness whereof I have hereunto set my hand at Jackson, Michigan, this 3d day of August, 1903.

HART T. SPEARS.

Witnesses:
　FLOYD D. SPEARS,
　CHESTER W. BROWN.